United States Patent [19]

Durand et al.

[11] 4,021,207
[45] May 3, 1977

[54] LIQUID HYDROCARBON COMPOSITIONS OF IMPROVED BEHAVIOR IN THE COLD AND CONTAINING DIENE POLYMERS

[75] Inventors: Jean-Pierre Durand, Chatou; Bernard Aubin, Malakoff; Francois Dawans, Bougival; Gilbert Chapelet, Bron, all of France

[73] Assignee: Institut Francais du Petrole, des Carburants et Lubrifiants et Entreprise de Recherches et d'Activities Pertolieres Elf, Rueil-Malmaison, France

[22] Filed: Nov. 27, 1974

[21] Appl. No.: 527,803

[30] Foreign Application Priority Data
Nov. 28, 1973 France .............................. 73.42470

[52] U.S. Cl. ...................................... 44/62; 44/80
[51] Int. Cl.² .......................................... C10L 1/18

[58] Field of Search .................................. 44/80, 62

[56] References Cited
UNITED STATES PATENTS

| 3,795,615 | 3/1974 | Pappas et al. | 252/59 |
| 3,812,034 | 5/1974 | Gaydasch | 44/62 |
| 3,862,825 | 1/1975 | Sweeney | 44/62 |

Primary Examiner—Allen B. Curtis
Assistant Examiner—Mrs. Y. Harris-Smith
Attorney, Agent, or Firm—Millen & White

[57] ABSTRACT

The behavior in the cold of crude oil or petroleum distillates may be improved by incorporation of polymeric substances such as a hydrogenated polybutadiene or a hydrogenated copolymer of butadiene with at least one conjugated aliphatic diolefin of 5–8 carbon atoms. The additive is active at concentrations of from 10 to 1,000 grams per m³ of oil.

10 Claims, No Drawings

LIQUID HYDROCARBON COMPOSITIONS OF IMPROVED BEHAVIOR IN THE COLD AND CONTAINING DIENE POLYMERS

This invention concerns the use of polymeric additives for improving the behaviour in the cold of petroleum distillates and crude oil, and the resulting compositions.

The importance of the behaviour in the cold of crude oil and petroleum distillates, particularly fuel-oils and gas-oils, is well known. When these products are cooled, a cloud appears, which is progressively converted to a crystalline precipitate of the wax contained therein. The wax crystals grow in a tri-dimensional network which occludes the product and may have serious consequences as to the pour point. In fact, these crystals are retained by the filters and other filtration devices commonly used, for example, on the distributor trucks and in the storage plants, which results in plugging of these filters and stopping of the pipes. This has required the use of additives which, by modifying or controlling the crystallization of the paraffins contained in these products, improve their behaviour in the cold.

Among the compounds improving the behaviour in the cold of gas-oils and fuel-oils, as proposed in the prior art, we can mention ethylene homo- or copolymers with various other monomers such as vinyl acetate, alkyl acrylates or other olefins, and also some partially hyrogenated butadiene-olefin copolymers and some butadiene homopolymers: these are, on the one hand, fully hydrogenated polybutadienes containing more than 10% of 1,2 units and, on the other hand, so-called "telechelic" polybutadienes, i.e. partially hydrogenated polybutadienes comprising functional groups at their ends. By examples, in the U.S. Pat. No. 3,446,740, it is stated that the partially hydrogenated polybutadienes are not active when they have no terminal hydroxy groups; an example of function-free and inactive polybutadiene is given: it relates to a partially hydrogenated polymer prepared by sodium catalysts which thus consists predominantly of 1,2 units.

The applicants have now unexpectedly discovered that certain function-free homo- or copolymers of conjugated diolefins, when conveniently hydrogenated, could be usefully employed for improving the behaviour in the cold of crude oil and middle distillates thereof, and particularly motor gas-oils and domestic fuel-oils.

The compositions according to the invention comprise a major proportion of crude oil or middle distillate thereof and a proportion, which suffice to improve its behaviour in the cold, of at least one polymeric substance consisting of a hydrogenated 1,3-butadiene homopolymer or a hydrogenated copolymer of 1,3-butadiene with at least one conjugated aliphatic diolefin containing from 5 to 8 carbon atoms, which has, as a whole:

a. from 20 to 100% of butadiene units and from 0 to 80% of units obtained from an aliphatic diolefin of 5–8 carbon atoms;

b. a microstructure corresponding to more than 50% of 1,4 addition units;

c. an average molecular weight by number of from 500 to 20,000, as determined before hydrogenation; and d. an olefinic unsaturation ratio of at most 80% of the units constituting the polymeric chain, with the proviso that, as regards the hydrogenated 1,3 butadiene homopolymers, this olefinic unsaturation ratio is at least 5%.

The preferred hydrogenated 1,3-butadiene homopolymers according to the invention are those whose microstructure consists of more than 90% of 1,4 addition units. It is also particularly important that their olefinic unsaturation ratio be neither higher than about 80% nor lower than 5% since, on the one hand, the ratio higher than 80% lead to products which have no effectiveness or only a weak effectiveness for improving the behaviour in the cold of crude oil and middle distillates and, on the other hand, the products having an unsaturation ratio lower than 5% are not sufficiently soluble in the liquid hydrocarbon compositions to be present at effective concentrations. The preferred unsaturation ratios of the invention are from 20 to 70%, particularly for the hydrogenated 1,3 butadiene homopolymers whose microstructure consists of more than 90% of 1,4 addition units.

The hydrogenated copolymers according to the invention more specially comprise from 20 to 90% of butadiene units and from 10 to 80% of units derived from a conjugated aliphatic diolefine containing from 5 to 8 carbon atoms, the latter being preferably isoprene or 1,3-pentadiene. The copolymers which comprise from 40 to 70% of butadiene units and from 30 to 60% of units from at least one other conjugated diolefine are preferred.

Active hydrogenated copolymers according to the invention must have an olefinic unsaturation ratio of at most 80% of the units constituting the polymer chain, the ratios of 40% and below being preferred. Thus copolymers having from 5 to 40% of unsaturated units may be usefully employed, although unsaturation ratios from 0 to 5% are not excluded (for example practically fully hydrogenated copolymers). The average molecular weight by number of the polymers and copolymers employed according to the invention may vary rather broadly (500 to 20,000) but those products which have an average molecular weight by number of from 1,000 to 10,000, for example from 1,000 to 5,000, are preferred, although values higher than 5,000 may also be used.

The products which are used according to the invention may be prepared by homo- or copolymerization in the presence of various conventional catalytic systems such as organolithium derivatives or nickel or cobalt containing catalysts of the Ziegler Natta type, the regulation of the molecular weights being obtained either by applying a hydrogen pressure or by providing the reaction mixture with certain unsaturated hydrocarbons such as 1-butene, allene, 1,2-butadiene or vinylcyclohexene. The polymers or copolymers are then hydrogenated according to conventional techniques of the prior art, for example in the presence of catalysts containing Raney nickel, platinum or palladium on coal or systems obtained by reacting transition metal derivatives such as carboxylates or acetylacetonates with organoreducing compounds such as organoaluminum compounds or organolithium compounds or their hydrides.

These products may also be obtained by homo- or copolymerization of 1,3-butadiene and a subsequent hydrogenation of the formed product according to the technique described in the French Pat. No. 2,144,984 which consists of preparing an unsaturated polymer or copolymer in the presence of a transition metal compound and treating this polymer or copolymer in situ with hydrogen while adding a reducing organometal compound.

The polymers of the invention are active in hydrocarbon compositions at concentrations ranging from 10 to 1,000 g/m$^3$ and preferably from 50 to 500 g/m$^3$.

The additives of the invention may be used alone or in admixture with other additives conventionally employed such as corrosion inhibitors or antioxidants, optionally with other additives improving the behaviour in the cold of gas-oils and fuel-oils such as, for example, pour point improvers.

The unexpected and specific aspects of the invention are illustrated by the following examples which constitute no limitation thereof. Examples 1, 3, 4, 5, 9, 10, 11, 15, 19 and 20 are given by way of comparison.

The microstructure of the polymers has been determined by nuclear magnetic resonance and infra-red spectrometry.

Their average molecular weight by number has been determined by vapor pressure osmometry.

The unsaturation number of the polymers has been determined by nuclear magnetic resonance.

Since the conventional determinations of the cloud point or the pour point do not represent correctly the troubles resulting from the bad behaviour in the cold of gas-oils and fuel-oils and specifically the plugging observed in pipes, we have mainly employed the limit filtrability temperature (LFT) test as described in AFNOR M 07.042 standard, although some determinations of the pour point have been made and the results given as a further indication.

EXAMPLE 1

1 mMole of nickel acetylacetonate and 4 mMoles of ethylaluminium sesquichloride are added to 100 cc of benzene containing 0.67 g of vinylcyclohexene. 43 g of 1,3-butadiene are then added in continuous manner to the stirred mixture at 0° C. After reaction for 5 hours, methanol is added to isolate by settling 35 g of liquid polybutadiene containing 98% of 1,4-units (1,4-cis: 85%; 1,4-trans: 13%; 1,2: 2%) and having an average molecular weight by number of about 1,400. Its unsaturation ratio is higher than 97% (polymer A).

EXAMPLES 2 AND 3

The preparation described in example 1 has been repeated, except that the polymerization reaction has been followed with hydrogenation carried out in the following manner: the unsaturated polymer has been re-dissolved in cyclohexane at a concentration of 10% by weight and hydrogenated in the presence of Raney nickel at a pressure of from 25 to 30 atmospheres and a temperature of 190° C. Depending on the hydrogenation time, polybutadienes of varied unsaturation ratios have been obtained. The hydrogenation times and the unsaturation ratios are given in table I.

EXAMPLE 4

52 g of 1-butene and 42 g of 1,3-butadiene have been added to 25 cc of toluene containing 4 mMole of nickel trifluoracetate chloride $CF_3COONiCl$ in a reaction vessel. After 2 hours of reaction at 60° C, 40 g of liquid polybutadiene was obtained, said polybutadiene containing 95% of 1,4-units (1,4-cis: 90%; 1,4-trans : 5%; 1,2 : 5%) and having an average molecular weight by number of about 2,000. Its unsaturation ratio was higher than 97% (polymer B).

EXAMPLES 5 TO 9

The preparation of example 4 has been repeated, except that the polymerization reaction was followed with hydrogenation carried out as follows:

The reaction mixture was freed of gas and 0.8 cc of acetylacetone, 58 cc of toluene and 12 mMole of triethylaluminum added thereto. The reaction vessel was maintained for a given time at 60° C under a pressure of 20 atmospheres.

Various hydrogenated polybutadienes of different unsaturation ratios were obtained.

The hydrogenation times and unsaturation ratios are given in table I. The temperature, when different from 60° C, is also given in table I.

EXAMPLE 10

50 cc of n-heptane, 34 g of isoprene and 33 g of 1,3-butadien have been added, in a reaction vessel, to 0.52 g of nickel chloride trifluoroacetate $CF_3COONiCl$. After 5 hours of stirring at 70° C, the polymer was isolated by precipitation in methyl alcohol and dried under reduced pressure up to constant weight. 55 g of a butadiene-isoprene copolymer containing 55% of butadiene units and 45% of isoprene units has been obtained. The microstructure of this polymer consists of more than 90% of 1,4-addition units. Its average molecular weight by number is about 2,500. Its unsaturation ratio is higher than 97% (polymer C).

EXAMPLES 11 TO 14

Example 10 has been repeated, except that the copolymerization reaction was followed with hydrogenation carried out as follows: gas was removed from the reaction mixture which was then admixed with 50 cc of n-heptane, 0.147 g of nickel as the octoate and 1.56 g of triethylaluminum. The reactor was then maintained at 70° C under a hydrogen pressure of 25 atmospheres for a given time. The hydrogenated polymer obtained was then isolated as described in example 10. By using different hydrogenation time, we have obtained different copolymers having various unsaturation ratios, as shown in table II. Except when the temperature is 70° C, its value is given in table II.

EXAMPLE 15

64 g of 1,3-butadiene, 51 g of isoprene and 15 mMole of butyllithium have been added to 300 cc of n-heptane in a reactor. After stirring for 3 hours at 40° C, a butadiene-isoprene copolymer containing 62% of butadiene units and 38% of isoprene units has been obtained. The microstructure of this polymer consists of 92% of 1,4 addition units. Its average molecular weight by number is 4,100. It has an unsaturation ratio of more than 97% (polymer D).

EXAMPLES 16 TO 18

Example 15 has been repeated, except that the copolymerization reaction has been followed with hydrogenation carried out as follows: the reaction mixture has been freed from gas and 100 cc of n-heptane, 0.177 g of cobalt as the octoate and 1.02 g of triethylaluminum have been added thereto. The reactor has been maintained at 140° C for a given time under a hydrogen pressure of 25 atmospheres. Depending on the hydrogenation time, the copolymers obtained have different unsaturation ratios as shown in table II.

EXAMPLE 19

40 cc of toluene, 31 g of 1,3-butadiene and 27 g of 1,3-pentadiene have been added in a reactor to 0.42 g of nickel trifluoroacetate chloride. After 4 hours of reaction at 60° C, we have isolated 50 g of a butadiene-pentadiene copolymer containing 60% of butadiene units and 40% of pentadiene units. Its microstructure consisted of more than 90% of 1,4 units and its average molecular weight by number was about 4,000 (polymer E).

EXAMPLES 20–22

Example 19 has been repeated, except that the copolymerization reaction has been followed with hydrogenation carried out as follows: the gas has been removed from the reaction mixture and 50 cc of n-heptane, 0.13 of nickel as the octoate and 1.71 of triethylaluminum have been added to said mixture. The reactor has then been maintained at 70° C for a given time under a hydrogen pressure of 25 atmospheres. We have thus obtained, by using various hydrogenation times, butadiene-pentadiene copolymers of different unsaturation ratios, as shown in table II. When the temperature was different from 70° C, its value was given in table II.

TEST 1

A preliminary determination of the solubility of the polymers and copolymers prepared according to examples 1–22 has shown that the polymers of examples 3 and 9 are practically insoluble and that the polymer of example 8 is only partially soluble, while the other polymers and copolymers are soluble in gas-oil, at least up to the concentrations of 1,000 g per m³ which are contemplated according to the invention.

300 g/m³ of each of the polymers and copolymers prepared according to examples 1–22 has been added to a gas-oil whose limit filtrability temperature was −3° C. The L.F.T. of each resulting composition has been determined. The results are given in tables I and II.

TABLE I

| Polymer of example | Initial polymer | Hydrogenation time | Unsaturation (%) | L.F.T. (° C) |
|---|---|---|---|---|
| 1 | A | 0 | > 97 | −3 |
| 2 | A | 6 h | 56 | −15 |
| 3 | A | 24 h | < 5 | −3* |
| 4 | B | 0 | > 97 | −3 |
| 5 | B | 1h30 | 87 | −6 |
| 6 | B | 3 h | 67 | −11 |
| 7 | B | 4 h | 44 | −14 |
| 8 | B | 6 h (90° C) | 17 | −5** |
| 9 | B | 12H (90° C) | 3 | −3* |

*The polymer is practically insoluble in gas-oil
**The polymer has a relatively reduced solubility in gas-oil.

TABLE II

| Copolymer of example | Initial copolymer | Hydrogenation time | Unsaturation (%) | L.F.T. (° C) |
|---|---|---|---|---|
| 10 | C | 0 | > 97 | −3 |
| 11 | C | 2 h | 88 | −4 |
| 12 | C | 4 h | 50 | −8 |
| 13 | C | 6 h | 30 | −15 |
| 14 | C | 8 h (100° C) | 3 | −15 |
| 15 | D | 0 | > 97 | −3 |
| 16 | D | 1 h | 16 | −15 |
| 17 | D | 1 h 15 | 6 | −17 |
| 18 | D | 4 h | < 3 | −15 |
| 19 | E | 0 | > 97 | −3 |
| 20 | E | 1 h | 81 | −4 |
| 21 | E | 4 h | 35 | −12 |
| 22 | E | 6 h (100° C) | 2 | −12 |

The results given in tables I and II show that the effectiveness of the polymers and copolymers greatly depends on their unsaturation ratio; in fact, the homopolymers and copolymers which have more than 80% unsaturation (ex. 1, 4, 5, 10, 11, 15, 19 and 20) have no influence or only a reduced influence on the limit filtrability temperature. Conversely, the additives having a smaller unsaturation are really very effective, particularly the homopolymers having an unsaturation lower than 70% and the copolymers having an unsaturation lower than 40%. Moreover, the homopolymers having an unsaturation lower than 5% are practically insoluble in gas-oil and have no influence whatsoever on the limit filtrability temperature.

TEST 2

The hydrogenated butadiene-isoprene copolymers prepared according to examples 13, 16, and 17 have been tested at various concentrations in four different gas-oils whose composition and distillation range are given in table III.

TABLE III

| Gas-oil No. | Distillation range | Composition |
|---|---|---|
| 13 | 152–354 | 45 % SIRTICA, 35 % QATAR 10 % TATAR, 10 % ARAMCO |
| 14 | 160–362 | 95 % NIGERIA, 5 % AMMA |
| 28 | 154–366 | ARAMCO |
| 29 | 150–366 | ES SIDER |

The results of limit filtrability temperature determinations obtained with each composition 24 hours and, for some of them, 4 weeks after doping, are given in table IV.

TABLE IV

| Additive of example | Concentration (g/m3) | Gas-oil No. 13 24 h | Gas-oil No. 13 4 weeks after doping | Gas-oil No. 14 24 h | Gas-oil No. 14 4 weeks after doping | Gas-oil No. 28 24 h | Gas-oil No. 28 4 weeks after doping | Gas-oil No. 29 24 h | Gas-oil No. 29 4 weeks after doping |
|---|---|---|---|---|---|---|---|---|---|
|  | 0 | −8° C | −8° C | −9° C | −9° C | −6° C | −6° C | −3° C | −3° C |
|  | 30 |  |  | −12 | −12 |  |  | −7 | −5 |
|  | 60 |  |  | −21 | −22 |  |  | −12 | −9 |
| 13 | 100 | −17 | −14 | −26 | −23 | −9 | −19 | −19 | −17 |
|  | 300 | −22 | −20 | −30 | −33 | −19 | −24 | −21 | −19 |
|  | 600 | −25 | −21 | −31 | −33 | −19 | −24 | −23 | −20 |
|  | 50 | −9 |  |  |  | −13 |  | −7 |  |
| 16 | 150 | −17 |  |  |  | −18 |  | −15 |  |
|  | 300 | −19 |  |  |  | −19 |  | −18 |  |
|  | 50 | −10 | −9 | −21 | −23 | −8 | −10 | −11 | −11 |
| 17 | 150 | −14 | −13 | −28 | −27 | −14 | −16 | −14 | −15 |

TEST 3

We have also determined the effect on decreasing the pour point of two gas-oils, of the copolymers prepared according to examples 13, 16 and 17, utilized at various concentrations. The determinations of the pour point have been carried according to the method NFT 60.103. The results are given in table V.

TABLE V

| Additive of example | Concentration g/m3 | Gas-oil No. 13 4 weeks after doping | Gas-oil No. 28 4 weeks after doping |
|---|---|---|---|
|  | 0 | −12° C | −12° C |
|  | 100 | −21 | −24 |
| 13 | 300 | −27 | −30 |
|  | 600 | −33 | −33 |
|  | 50 | −23 | −23 |
| 16 | 150 | −29 | −29 |
|  | 50 | −19 | −21 |
| 17 | 150 | −29 | −29 |

What we claim is:

1. A composition of petroleum middle distillate of lowered limit filterability temperature, comprising a major amount of a petroleum middle distillate and from 10 to 1,000 g/m³ of at least one hydrogenated copolymer of 1,3-butadiene and at least one different conjugated aliphatic diolefin selected from the group consisting of isoprene and 1,3-pentadiene, wherein said hydrogenated copolymer contains from 20 to 90% of butadiene units and from 10 to 80% of units derived from said different conjugated diolefin, and has a microstructure, as determined before hydrogenation, of at least about 90% of 1,4-addition units, a number average molecular weight of 500 to 20,000 and an olefinic unsaturation ratio of not more than 40% of the units constituting the polymeric chain.

2. A composition according to claim 1, wherein said hydrogenated copolymer contains from 40 to 70% of butadiene units and from 30 to 60% of units from said different conjugated diolefin.

3. A composition according to claim 1, wherein said hydrogenated copolymer has an olefinic unsaturation ratio of at least 5% of the units constituting the polymeric chain.

4. A composition according to claim 1, wherein said hydrogenated copolymer is a substantially completely hydrogenated copolymer.

5. A composition according to claim 1, wherein said hydrogenated copolymer is a hydrogenated copolymer of 1,3-butadiene with isoprene.

6. A composition according to claim 1, wherein said hydrogenated copolymer is a hydrogenated copolymer of 1,3-butadiene with 1,3-pentadiene.

7. A composition according to claim 1, wherein said hydrogenated copolymer has an average molecular weight by number of from 1,000 to 10,000.

8. A composition according to claim 1, wherein the proportion of said hydrogenated copolymer is 50–500 g/m3 of composition.

9. A composition according to claim 1, said composition comprising a major proportion of gas-oil.

10. A composition according to claim 1, said composition comprising a major proportion of fuel-oil.

* * * * *